April 7, 1942. A. L. HOBART 2,278,877
FLOOD LIGHTING
Filed Aug. 28, 1940
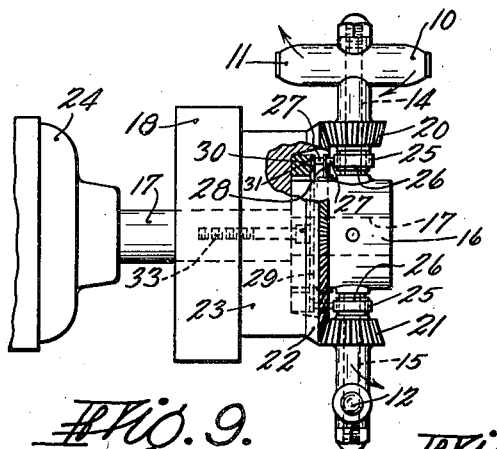
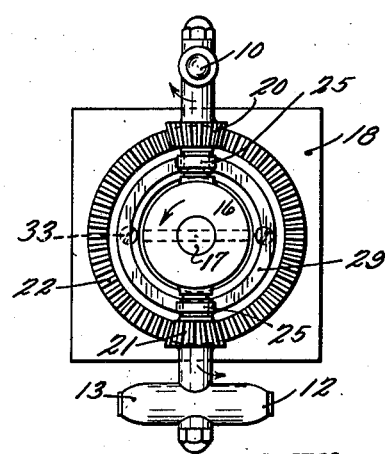
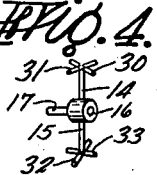
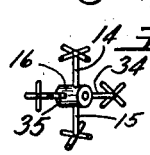
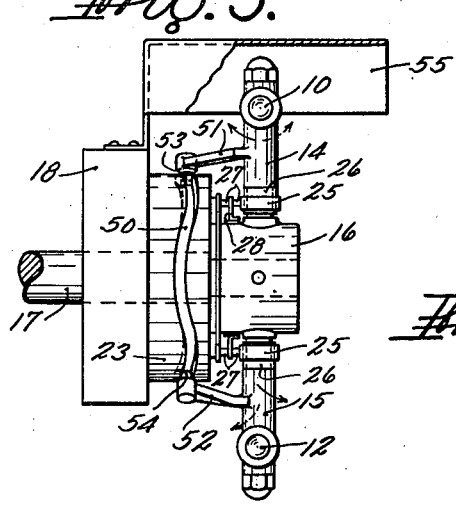
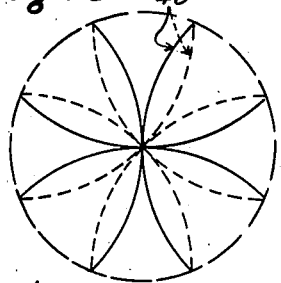
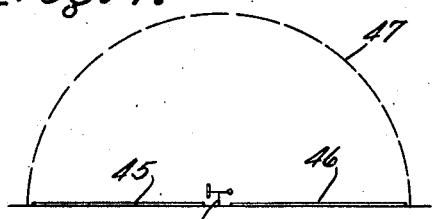
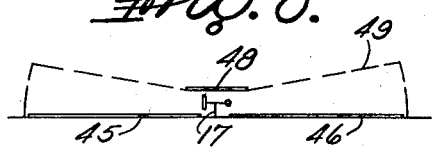
INVENTOR
ALFRED L. HOBART
BY Chapin + Neal
ATTORNEYS Patented Apr. 7, 1942

2,278,877

UNITED STATES PATENT OFFICE 2,278,877

FLOOD LIGHTING

Alfred L. Hobart, Springfield, Mass.

Application August 28, 1940, Serial No. 354,478

3 Claims. (Cl. 240—49)

This invention relates to flood lighting and similar types of illumination.

The principal object of the invention is to provide flood lighting of a substantial area by means of a single installation. Further objects having particular reference to the lighting of highways, straight or curved, the lighting of ball parks and airplane landing fields, the spotting of airplanes in the air, and to landing lights for airplanes will be made apparent in the following specification and claims.

In the accompanying drawing:

Fig. 1 is a side elevational view of one embodiment of my invention;

Fig. 2 is a front elevational view of the structure shown in Fig. 1;

Fig. 3 is a side elevational view of a modified form;

Figs. 4 and 5, are diagrammatic views of further modifications;

Fig. 6 is a graph of the approximate path followed by one of the light sources of Fig. 1;

Figs. 7 and 8 diagrammatically illustrate one use of the invention; and

Fig. 9 is a diagrammatic view of a modification particularly adapted for airplane spotting.

In general I propose to move a light beam source so that the beam passes over the area or path to be illuminated at a speed sufficiently high so that the path or area is continuously lighted through the persistence of vision. For lighting relatively wide areas I propose to rotate one or more light beam sources simultaneously about two axes at right angles to each other.

In the form illustrated in the drawing I have shown four light beam sources 10, 11, 12, and 13, in the form of electric lights, provided with the the usual lenses and reflectors, to produce a beam of light. The sources 10 and 11 are directed in opposite directions at right angles to a rotatable shaft 14 upon which they are rigidly mounted to turn with the shaft. Sources 12 and 13 are similarly mounted on a shaft 15 and are directed at right angles to 10—11. Shafts 14 and 15 are rotatably mounted in a hub 16 secured to a shaft 17 positioned at right angles to shafts 14 and 15 and journaled in a stationary supporting member 18. Shafts 14 and 15 are respectively provided with bevel gears 20 and 21 engaging a stationary bevel ring gear 22 formed on a circular block 23. Shaft 17 is rotated by any suitable means such as an electric motor 24. As hub 16 is rotated by shaft 17 gears 20 and 21, traveling on gear 22, rotate the shafts 14 and 15 thereby rotating light beam sources 10—11 and 12—13 about the axis of shaft 14 and 15 as the light sources are simultaneously carried in a circular path around the axis of shaft 17. Current for the light sources may be conducted thereto in any suitable manner. As shown one terminal of each light is "grounded" to the supporting structure, the other terminals being connected to bands 25 insulated by sleeves 26 from the shafts 14 and 15. Brushes 27 secured by insulating brackets 28 to hub 16 contact with bands 25 and with a stationary ring 29 secured to an annular insulator 30 by screws 31. The insulator 30 and block 23 carrying ring gear 22 are secured to the support 18 by screws 33 the heads of which are counter sunk in the insulator 30. It will be understood that stationary ring 29 and the "ground" are connected by suitable conductors, not shown, to a source of current for the lights.

The speed of rotation must be sufficiently high so that each part of the field is reilluminated within the period of the persistence of vision. Vision of an illuminated object will persist under ideal conditions for about one-half second, but for practical purposes the object should be reilluminated oftener than twice a second. Reillumination within the period of persistence of vision for the conditions of a given installation is the lower limit of the rate of movement of the lights. The larger the number of light sources moving over a given path, the lower will be the speed necessary to reilluminate a given portion of the path within the period of persistence of vision. Also the larger the number of light sources traveling different paths, the greater can be the concentration of each beam since with an increase in the number of paths swept by the beams less diffusion is necessary to cause overlapping of the paths. In the diagram of Fig. 4 shafts 14 and 15 are each provided with an additional pair of light sources 30—31 and 32—33, respectively, the four sources on each shaft being directed at right angles, and the sources on one shaft being offset 45° from those on the other. Fig. 5 illustrates the addition of two more shafts 34—35 to the hub 16 at right angles to shafts 14—15 each provided with four light sources. By offsetting shafts 34—35 with respect to shafts 14—15, shafts 34—35 can be given a gear ratio with reference to shaft 17 different from that between 17 and 14—15. If the distance between the opposite ends of shafts 14—15 and 34, 35 is small relative to the radius of the spherical surface of illumination covered by the sweep of the beams the light sources may be considered as emanating from the center of the sphere, each rotating simultaneously about two axes at right angles to each other. The approximate path of such a beam is diagrammatically indicated at 40 in Fig. 6 which represents a sphere with the light source at its center. For clearness of illustration the path is shown as a line without diffusion. It is a single continuous line passing repeatedly across the poles of the sphere at constantly changing angles. The portions of the path on the adjacent side of the sphere are shown in full line and the portions on the opposite side in dotted line. A four to one speed ratio between shafts 14—15 and 17 has been used in plotting Fig. 6. This latter figure indicates the flexibility of my invention in meeting various conditions. If we assume that path 40 of Fig. 6 represents the path of the beam from light source 10 the beam from 11 will follow the same path but 180° behind that of 10, in other words beam 11 will trace the dotted portion while 10 is tracing the full line portion and vice-versa. It is also obvious that the beams from sources 12 and 13 are simultaneously tracing a similar path but offset 45° from path 40. Additional paths are provided by the addition of lights as in Figs. 4 and 5. It will also be obvious that if light sources 10—11 and 12—13 are arranged parallel, that all four beams will follow path 40 doubling the intensity of the illumination over the path or decreasing the necessary speed. This parallel arrangement may be advantageous where relative small areas are to be lighted or the lights are sufficiently powerful to permit adequate diffusion of the beams. The various possible angular arrangements of the multiplicity of lights shown in Figs. 4 and 5, and the resulting variations in the results thereby to be obtained are obvious. By the use of a non-integral gear ratio the path 40 may be caused to progressively shift its position.

Fig. 7 diagrammatically illustrates an installation of my invention in the illumination of two landing fields 45 and 46, the hemispherical dome of illumination being indicated in broken lines at 47. It will be understood that the extent of illumination can be controlled by any desired partial screening of the light, as in Fig. 8 where a circular shield 48 has been placed over the light sources to cut out the sky lighting, the resulting "disc" of illumination being indicated at 49.

In Fig. 3 is shown a modified arrangement suitable for flood lighting curved roads, and the like. The arrangement is similar to that of Figs. 1 and 2 except that light sources 10—11 and 12—13 are mounted parallel and the gearing 20—22 has been replaced by means to oscillate the light sources about their shafts rather than rotate them. As shown this means includes a cam groove 50 formed in the surface of block 23. Shafts 14 and 15 are respectively provided with arms 51 and 52 extending to the side and rear which carry followers 53 and 54 riding in the cam groove 50. Groove 50 is given a form such that as the light sources move through the lower half or other fraction of the lower portion of their rotation around the axis of shaft 17 they are oscillated to follow the curvature of the road above which the device is mounted, the speed of rotation, as before, being sufficiently high to effect a continuous illumination of the desired length of road surface. A shield 55 secured to support 18 shields the upper portion of the path of rotation of the light sources. It will be understood that to illuminate a straight strip of road shafts 14 and 15 will be fixed to the hub.

This latter arrangement, in which the beams are all directed in a common plane at right angles to shaft 17, finds further special utility in spotting airplanes at night since such an arrangement using a multiplicity of lights produces a complete arc of relatively great intensity, since all lights sweep the same path. Two such devices arranged to produce arcs at right angles to each other, simultaneously sweeping the sky sidewise, would inevitably spot an enemy plane and the intersection of the arcs could be held on the plane more easily than could simple search lights. For this type of use the light sources can be mounted radially in hub 16, as shown diagrammatically at 60 in Fig. 9, and as there shown the support 61 of shaft 17 may be given a relatively slow, controlled, oscillation about a shaft 62 positioned at right angles to the axis of rotation of shaft 17, to effect a slow sidewise sweep of the lighted arc, by any suitable means such as rack 63 which engages a gear segment 64 on support 61.

Devices according to my invention may be mounted on trucks and employed to light emergency landing fields and the like. Such mobile installations would have many uses where flood lighting is needed for any night operation, such as bridge building and railway repair work, car and ship loading, and other activities. Small devices may be installed in airplanes as landing lights and for other purposes.

I claim:

1. The method of flood lighting which comprises rotating each of a plurality of beams of light simultaneously about two axes substantially at right angles to each other, including at least two beams following the same path in spaced relation, and at least two other beams following one another in spaced relation along another path, said paths being angularly offset from each other, the speed of rotation of the beams being sufficient to successively position said beams at any given point in their paths of movement within the period of the persistence of vision.

2. The method of flood lighting which comprises rotating each of a plurality of beams of light simultaneously about two axes substantially at right angles to each other, including at least two beams following the same path and spaced substantially 180° from each other, and at least two other beams following a second path and spaced substantially 180° from each other, said paths being angularly offset from each other substantially 45°, the speed of rotation of the beams being sufficient to successively position said beams at any given point in their paths of movement within the period of the persistence of vision.

3. A flood light which comprises a rotatable shaft, a pair of rotatable shafts extending at an angle to said first named shaft and carried thereby, a pair of oppositely directed light sources carried by each shaft of said pair with their beams directed at an angle to the axes of rotation of said pair of shafts, and means to simultaneously rotate all of said shafts at speeds sufficient to return each beam to any given point in its path of movement within the period of the persistence of vision.

ALFRED L. HOBART.